United States Patent [19]
Ciccarelli et al.

[11] Patent Number: 6,125,834
[45] Date of Patent: Oct. 3, 2000

[54] FREE-PISTON CUTTING MACHINE

[75] Inventors: Gaby Ciccarelli; Manomohan Subudhi, both of East Setauket; Robert E. Hall, Port Jefferson, all of N.Y.

[73] Assignee: Brookhaven Science Associates, Upton, N.Y.

[21] Appl. No.: 09/236,422

[22] Filed: Jan. 25, 1999

[51] Int. Cl.$^7$ .................................................. F41B 11/00
[52] U.S. Cl. ................... 124/65; 124/71; 124/72; 124/73; 89/7; 83/639.4; 227/9; 227/10; 227/11
[58] Field of Search ................. 129/65, 71–73; 89/7; 83/639.4; 227/9, 10, 11

[56] References Cited

U.S. PATENT DOCUMENTS

| | | |
|---|---|---|
| 2,965,000 | 12/1960 | Skinner . |
| 3,695,715 | 10/1972 | Godfrey . |
| 4,709,686 | 12/1987 | Taylor et al. . |
| 4,770,269 | 9/1988 | Woodrow . |
| 4,771,758 | 9/1988 | Taylor et al. . |
| 5,193,517 | 3/1993 | Taylor et al. . |
| 5,574,244 | 11/1996 | Powell et al. . |
| 5,996,709 | 12/1999 | Norris . |

*Primary Examiner*—Michael J. Carone
*Assistant Examiner*—Dan Beitey
*Attorney, Agent, or Firm*—Margaret C. Bogosian

[57] ABSTRACT

A cutting machine includes a gun barrel for receiving a projectile. A compression tube is disposed in flow communication with the barrel and includes a piston therein. A reservoir is disposed in flow communication with the tube and receives a first gas under pressure. A second gas fills the compression tube on a front face of the piston. And, the pressurized first gas is discharged into the tube on a back face of the piston to accelerate the piston through the tube for compressing the second gas, and in turn launching the projectile through the barrel to impact a workpiece.

20 Claims, 2 Drawing Sheets

FREE-PISTON CUTTING MACHINE

This invention was made with Government support under contract number DE-AC02-98CH10886, awarded by the U.S. Department of Energy. The Government has certain rights in the invention.

BACKGROUND OF THE INVENTION

The present invention relates generally to cutting machines, and, more specifically, to those using hypervelocity projectiles therein.

U.S. Pat. No. 5,574,244-Powell et al. discloses an apparatus for firing projectiles at hypervelocity for cutting a workpiece, such as regular or steel-reinforced concrete. The projectiles are fired through a long barrel using a gas such as helium heated in a thermal storage tank for achieving high pressure for propelling the projectile with sufficient energy for cutting the workpiece.

This apparatus, however, is relatively large and complex for firing the projectiles with the high-temperature and high-pressure helium gas.

Accordingly, it is desired to provide a compact and simpler hypervelocity cutting machine which does not require the generation and storage of the high-temperature and high-pressure propellant gas.

BRIEF SUMMARY OF THE INVENTION

A cutting machine includes a gun barrel for receiving a projectile. A compression tube is disposed in flow communication with the barrel and includes a piston therein. A reservoir is disposed in flow communication with the tube and receives a first gas under pressure. A second gas fills the compression tube on a front face of the piston. And, the pressurized first gas is discharged into the tube on a back face of the piston to accelerate the piston through the tube for compressing the second gas, and in turn launching the projectile through the barrel to impact a workpiece.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
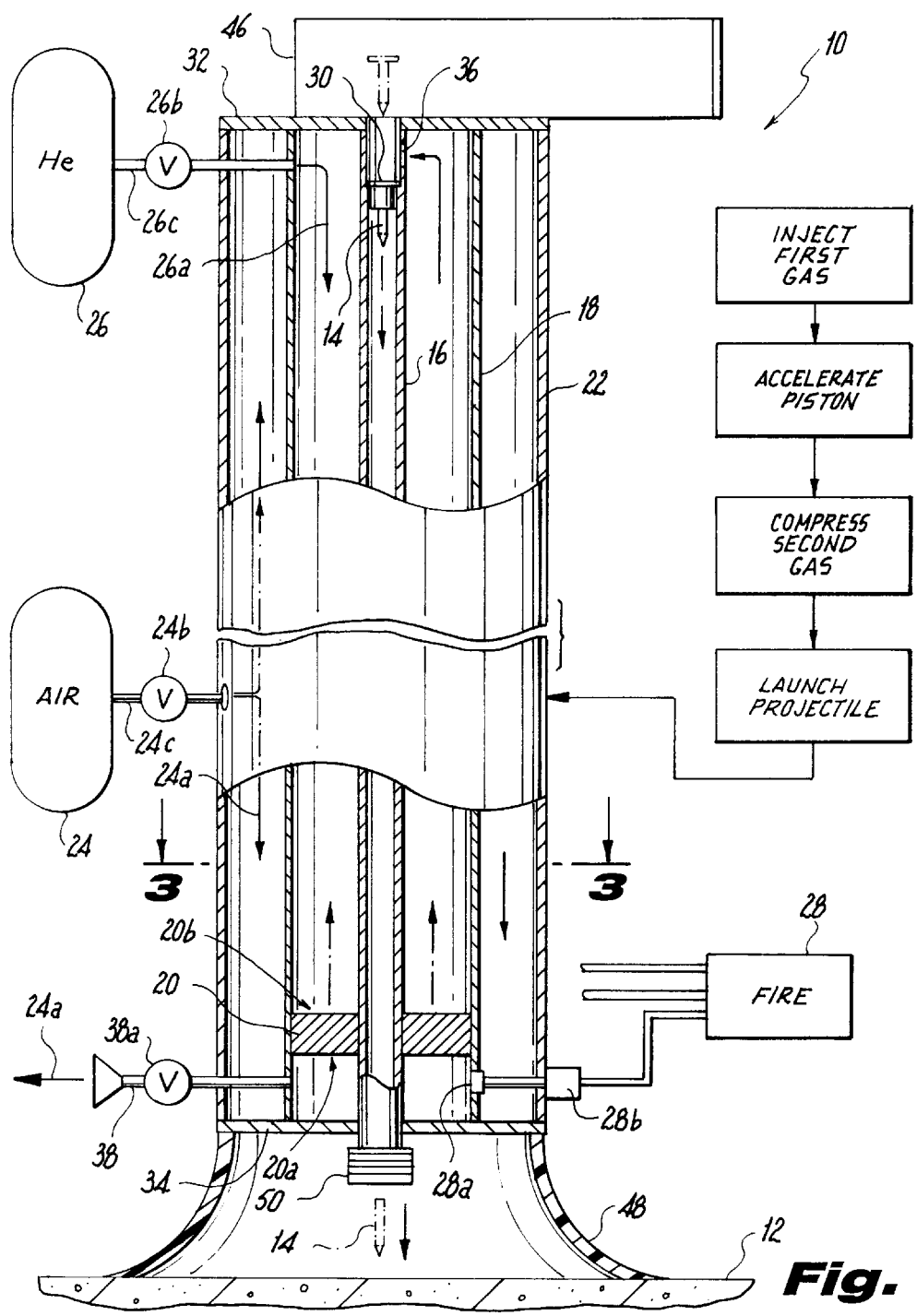
FIG. 1 is a partly sectional and schematic elevational view through a free-piston hypervelocity cutting machine, with a corresponding process flowchart, in accordance with an exemplary embodiment of the present invention.

FIG. 1 illustrates an exemplary embodiment of a free-piston cutting machine 10 in accordance with the present invention. The machine is configured for cutting a workpiece 12 by firing thereat a series of projectiles 14. The workpiece may have any conventional form which may be cut by projectile impact, such as regular or steel-reinforced concrete for example.

The machine includes an elongate gun barrel 16 configured for receiving and launching the projectiles in turn. A tubular compression tube 18 is disposed in flow communication with the barrel, and includes a free-floating annular piston 20 therein. A charge tank or reservoir 22 is disposed in flow communication with the compression tube.

Means in the exemplary form of a first supply tank 24 are disposed in flow communication with the reservoir 22 for supplying thereto a first gas 24a under high pressure. Means in the exemplary form of a second supply tank 26 are disposed in flow communication with the compression tube 18 for supplying thereto a second gas 26a under a relatively low pressure.

The cutting machine 10 illustrated in FIG. 1 is effective for cutting the workpiece 12 by projectile impact, with the projectile being fired or launched from the barrel by adiabatically compressing the second gas using the free-floating piston 20. The piston is accelerated in the compression tube by applying to a back face 20a thereof the first gas 24a under high pressure. The second gas 26a is initially at relatively low pressure in the compression tube 18 on a front face 20b of the piston. The resulting differential pressure across the piston rapidly accelerates the piston which in turn compresses the second gas 26a adiabatically for greatly increasing both its pressure and temperature.

As the piston 20 travels from one end of the tube 18 to the opposite end thereof, the second gas 26a undergoes maximum compression which is then applied against the projectile 14 for firing or launching the projectile through the barrel 16 and against the workpiece 12 for the impact cutting or fracture thereof.

Instead of separately heating and storing the propellant gas 26a for use in firing the projectiles, the gas is initially provided at room temperature for example and at a relatively low pressure for providing a suitable propellant charge or gas within the compression tube. The first gas 24a is then used to accelerate the piston to compress the second gas 26a immediately prior to firing the projectile. Maximum projectile velocities may be obtained by using different first and second gases, with the second gas 26a having a greater speed of sound therein than the first gas which allows for rapid decompression of the second gas. And, high compression pressures of the second gas are effected using a relatively low pressure first gas to explosively launch the projectile with substantial momentum.

In a preferred embodiment, the first gas 24a used for driving the piston may simply be air under a suitable pressure of about 500–750 psi for example. The second gas 26a for propelling the projectile is preferably helium which is substantially lighter than air. The bore and stroke length of the compression tube 18 may be selected for compressing the helium from an initial pressure of about 20–50 psia to a maximum pressure of up to about 15,000 psi for example. Such high propellant pressure when applied to a projectile having a mass of a few grams can launch that projectile to a discharge velocity of up to about 10,000 feet per second.

The use of the two different gases 24a,26a ensures that the projectile 14 can achieve such hypervelocity. The use of the two gases, however, requires corresponding control thereof. In particular, means 28 are provided for abruptly firing or discharging the first gas from the reservoir 22 into the compression tube 18 on the piston back face 20a for accelerating the piston through the tube for compressing the second gas on the front face 20b.

The firing means 28 are preferably effective to increase the pressure on the piston back face 20a from a relatively low pressure such as atmospheric pressure to the maximum pressure of the gas in the reservoir 22 substantially instantaneously in a time significantly shorter than the time of travel of the piston 20 over its full stroke in the compression tube 18. For example, pressure should build up on the piston back face 20a to the maximum pressure within the reservoir 22 preferably within a time being an order of magnitude less than the subsequent travel time of the piston through the compression tube. A preferred pressure build up time is a few milliseconds.

Correspondingly, maximum compression pressure within the tube 18 is preferably achieved by providing a seal in the form of a diaphragm 30 between the barrel and the tube at the projectile, which is sized to rupture when the compressed second gas achieves a suitably high pressure, for in turn launching the projectile down the barrel. The seal 30 is illustrated in more particularity in FIG. 2 as temporarily closing or sealing the top of the barrel above the projectile as the second gas 26a is being compressed by the accelerating piston. The seal 30 is sized to rupture as the piston reaches the end of its travel and the second gas reaches a preferred maximum pressure. The seal 30 then explosively ruptures for correspondingly instantaneously launching the projectile through the barrel at hypervelocity.

Referring again to FIG. 1, the barrel 16, compression tube 18, and reservoir 22 may be joined together in various configurations such as being coaxial and end-to-end (not shown), or laterally adjoining each other as illustrated. In the former, a relatively long cutting machine is effected since the lengths of these three components are added. In the adjoining configuration illustrated in FIG. 1, the overall length of the cutting machine is controlled by the longest of these three components, which may be sized to be substantially equal in length for effecting a compact and relatively small cutting machine of about six feet for example.

Figure 3:
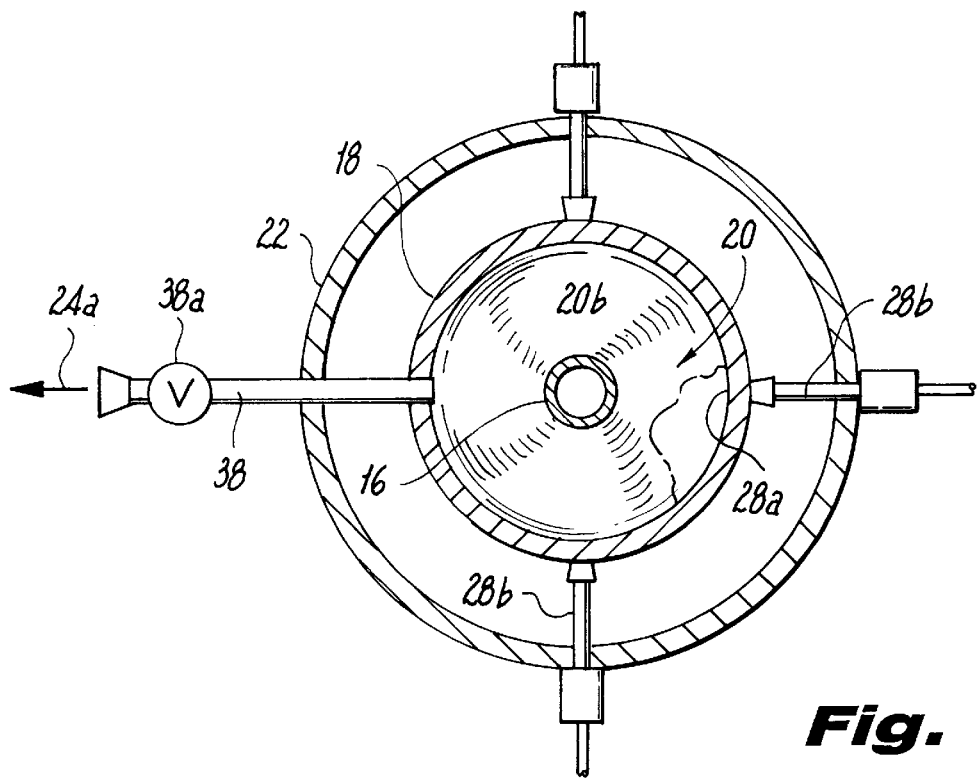
FIG. 3 is a transverse sectional view through the machine illustrated in FIG. 1 and taken along line 3—3.

In the preferred embodiment illustrated in elevation in FIG. 1, and in transverse section in FIG. 3, the compression tube 18 concentrically surrounds the barrel 16, and the barrel 16 extends coaxially through the piston 20. Accordingly, the inner diameter or bore of the compression tube 18 is preferably cylindrical and smooth, and correspondingly the outer surface of the barrel 16 is cylindrical and smooth. The piston 20 is preferably a solid annular disk having a center bore surrounding the barrel 16. And, the outer perimeter of the piston and its inner bore preferably include piston ring seals which may take any conventional form for ensuring maximum pressure difference between the opposite sides of the piston with little if any leakage of the two gases therebetween.

FIG. 1 illustrates the cutting machine just prior to firing the projectile. The piston 20 is located at the bottom of the compression tube 18. The annular space between the reservoir 22 and the tube 18 is pressurized with the first gas 24a by opening a corresponding valve 24b in an inlet conduit 24c disposed in flow communication between the supply tank 24 and the reservoir 22.

The second gas 26a is charged into the annular space between the tube 18 and barrel 16 by opening a corresponding valve 26b in an inlet conduit 26c disposed in flow communication between the supply tank 26 and the tube 18. And, the projectile 14 and cooperating seal 30 are loaded at the top of the barrel 16.

The pressurized gas 24a may then be admitted or injected into the bottom of the compression tube 18 below the piston 20 for accelerating the piston in a first or up direction to compress the propellant gas 26a behind the seal 30. When the propellant reaches a suitable high pressure, such as about 13,500 psi for example, the diaphragm seal 30 ruptures to spontaneously propel or launch the projectile in a second or down direction which is opposite to the up direction of the piston. The direction of travel of the piston 20 and the projectile 14 are accordingly opposite to each other, and correspondingly the inertia forces therefrom are also opposite and self-canceling in part.

The concentric arrangement of the barrel 16, tube 18, and reservoir 22 illustrated in FIG. 1 may be effected using corresponding cylindrical walls extending vertically between an upper endplate 32 and lower endplate 34. The radial spacing between the barrel and tube, and between the tube and reservoir are selected in conjunction with the operating pressures of the first and second gases to control the adiabatic compression process and resultant explosive energy of the compressed propellant gas 26a, and in turn the discharge velocity of the projectile 14.

Figure 2:
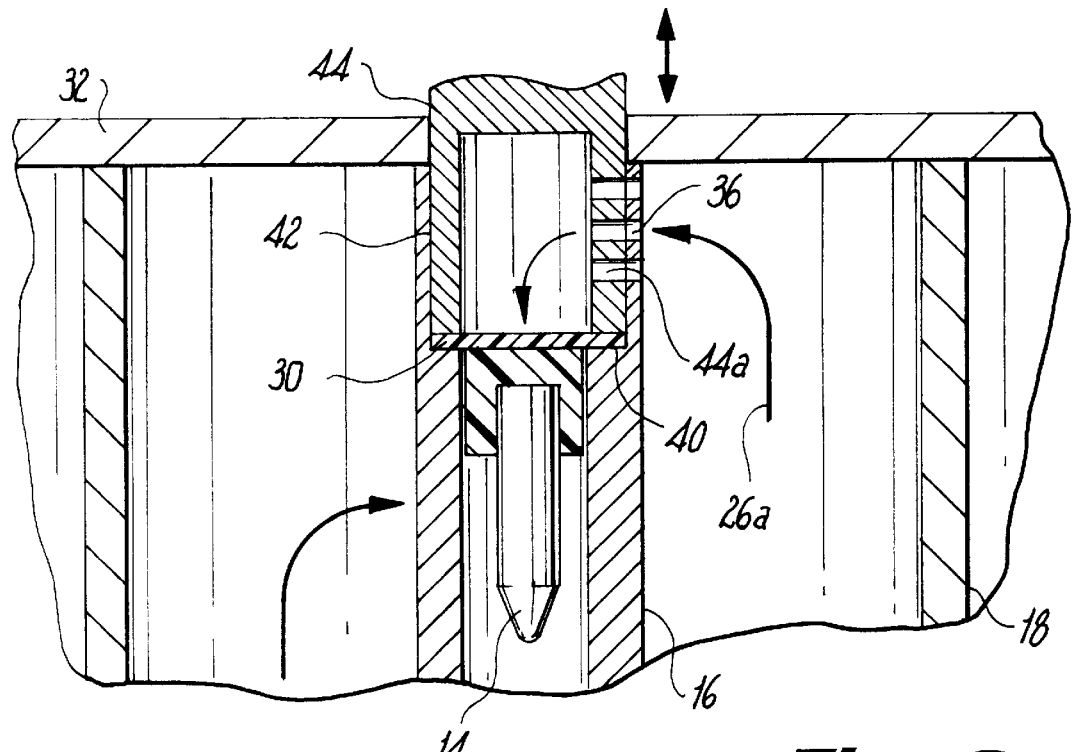
FIG. 2 is an enlarged, elevational sectional view through the top end of the machine shown in FIG. 1 illustrating gas flow at the projectile for launching thereof.

In the compact configuration illustrated in FIGS. 1 and 2, the barrel 16 preferably includes a gas inlet 36 at the top end thereof disposed atop the loaded projectile. The firing means 28 preferably include at least one gas inlet 28a at the bottom of the compression tube 18 adjacent the bottom end of the barrel through which the temporarily stored piston driving gas 24a is channeled into the bottom end of the tube for accelerating the piston upwardly toward the barrel gas inlet 36 to launch the projectile in the opposite direction toward the tube gas inlet 28a.

As shown in more detail in FIG. 3, the firing means 28 preferably include a plurality of the tube gas inlets 28a circumferentially spaced apart from each other around the perimeter of the tube 18. A respective plurality of solenoid valves 28b cooperate with the gas inlets 28a for initially closing these inlets until the machine is charged and ready for firing. Each solenoid valve includes a suitable valve stem sized in diameter to block the corresponding gas inlet 28a, with the stem being selectively retractable by an electrical solenoid joined to a suitable power supply and controller of the firing means 28.

The solenoid valves 28b may be instantaneously retracted in a few milliseconds to provide substantially unobstructed flow through the corresponding gas inlets 28a for discharging the driving gas 24a into the compression tube for accelerating the piston 20. A suitable number of solenoid valves and cooperating gas inlets are provided to ensure multiple entry into the compression tube for obtaining substantially instantaneous pressure rise on the piston back face 20a to the maximum pressure of the stored driving gas 24a in the reservoir without significant pressure loss or delay.

In an alternative embodiment (not shown), the barrel 16, tube 18, and reservoir 22 may be aligned coaxially together end-to-end, with the firing means 28 being in the preferred form of a pair of rupture seals or diaphragms initially separating the reservoir from the compression tube. In this configuration, the reservoir may be charged to a full pressure, and the intervening space between the two rupture diaphragms may be charged to about half that pressure. Firing is then effected by bleeding the pressure from between the two diaphragms until the differential pressure across the first diaphragm causes its rupture which in turn instantaneously ruptures the second diaphragm. In this way, precise and controlled rupture of the diaphragms is effected for instantaneously discharging the pressurized driving gas against the piston for its acceleration.

After the projectile 14 illustrated in FIG. 1 is fired, the piston 20 is driven to the top of the compression tube. The piston 20 may be retracted to its initial lower position by injecting a new charge of the propellant gas 26a into the tube and against the piston front face 20b. Since the solenoid valves 28b are preferably closed at this time, the remaining driving gas 24a in the tube behind the piston back face 20 is vented to avoid compression resistance thereof.

More specifically, the supply conduit 26c is preferably joined in flow communication with the top of the compression tube as shown in FIG. 1 to supply a new charge of the propellant gas 26a against the piston front face 20b to retract downwardly the piston. The tube 18 includes a vent 38 and cooperating valve 38a disposed adjacent the gas inlets 28a so that the piston may be driven completely downwardly to its original position near the gas inlets 28a without restraint by the remaining driving gas 24a which is discharged through the vent 38. Once the piston is fully retracted, the vent valve 38a may be closed for the next cycle.

As indicated above, the diaphragm seal 30 illustrated in FIG. 2 prevents premature escape of the propellant gas 26a during the compression cycle in which the piston is being accelerated toward the barrel gas inlet 36. The barrel 16 preferably includes a cylindrical seat 40 in the form of a counterbore at the top end thereof which is disposed directly adjacent the barrel gas inlet 36. The seat 40 supports the diaphragm seal 30 around its entire perimeter for maintaining sealing contact therewith as the pressure of the propellant gas 26a increases thereatop during the compression cycle. The seal 30 may be formed of any suitable material and sized so that when the propellant gas 26a reaches a predetermined pressure, the seal 30 ruptures around its perimeter for permitting the propellant gas 26a to drive the projectile 14 through the barrel.

In the preferred embodiment illustrated in FIG. 2, the upper portion of the counterbore defining the seat 40 in the top end of the barrel defines a coaxial projectile inlet 42 which receives a tubular plunger 44. The plunger is solid at its upper end, and hollow and open at its lower end so that the corresponding annular perimeter thereof engages the top surface of the diaphragm seal 30 for maintaining it in sealing contact against its seat 40. The plunger 44 includes one or more side ports 44a aligned with corresponding apertures of the barrel gas inlet 36 for channeling the propellant gas 26a atop the seal 30 for launching the projectile upon rupture thereof.

As shown in FIG. 2, the diaphragm seal 30 may be formed in an integral casing surrounding the projectile 14 for both initially sealing the top of the barrel while supporting the projectile therein. The plunger 44 is selectively removable so that the projectiles may be individually inserted into position atop the seat 40, with the plunger being reinserted for the next cycle. The plunger may be fixedly attached to the upper endplate 32 by being threaded therein, or otherwise externally supported as desired.

For example, the plunger 44 may form part of a storing and loading magazine 46, as shown in FIG. 1, in which a suitable number of the projectiles 14 are stored in sequence and successively loaded into the barrel by retracting and deploying the plunger correspondingly.

As also shown in FIG. 1, the lower endplate 34 may be suitably positioned directly above the workpiece 12 and surrounded by a suitable skirt 48. The bottom end of the barrel 16 may extend downwardly from the lower endplate 34 and may include a suitable silencer 50 therearound. The projectiles 14 may then be repetitively fired from the barrel into the workpiece 12 with the skirt 48 containing the debris and dust therefrom.

The use of the free-piston driven by compressed air provides a simple apparatus for adiabatically compressing the propellant helium to pressures considerably greater than the initial pressure of the driving air. The concentric arrangement of the barrel, compression tube, and reservoir provide a compact arrangement and corresponding benefits therefrom. For example, since the pressurized reservoir 22 surrounds the compression tube 18, the differential pressure acting across the walls of the compression tube are reduced by the elevated pressure of the external driving air which decreases the strength requirements of the compression tube itself.

And, the air and helium supplies may be maintained at ambient temperature, with the helium being compressed and heated solely during the adiabatic compression thereof by the free-floating piston. This increases safety of operation, and allows the cutting machine to operate at reduced temperature without the need for additional cooling thereof, unless desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A machine for cutting a workpiece by a projectile impact comprising. an elongate gun barrel for receiving said projectile;

a compression tube disposed in flow communication with said barrel, and including a piston therein;
   a reservoir disposed in flow communication with said tube;
   means for supplying said reservoir with a first gas under pressure;
   means for supplying said tube on a front face of said piston with a second gas having a greater speed of sound therein than said first gas; and
   means for firing said first gas from said reservoir into said tube on an opposite back face of said piston to accelerate said piston through said tube for compressing said second gas and in turn launching said projectile through said barrel to impact said workpiece.

2. A machine according to claim 1 wherein said firing means are effective for discharging said first gas from said reservoir into said tube to increase pressure on said piston back face to said first gas pressure substantially instantaneously in a time shorter than time of travel of said piston through said tube.

3. A machine according to claim 2 further comprising a seal between said barrel and tube at said projectile sized to rupture under said compressed second gas for launching said projectile.

4. A machine according to claim 3 wherein said barrel, tube, and reservoir are laterally adjoining.

5. A machine according to claim 3 wherein said barrel and tube are laterally adjoining.

6. A machine according to claim 5 wherein said tube concentrically surrounds said barrel, and said barrel extends coaxially through said piston.

7. A machine according to claim 6 wherein:
   said barrel includes a gas inlet at one end; and
   said firing means include a gas inlet in said tube adjacent an opposite end of said barrel for accelerating said piston toward said barrel gas inlet to launch said projectile in an opposite direction generally toward said tube gas inlet.

8. A machine according to claim 7 wherein said reservoir concentrically surrounds said tube.

9. A machine according to claim 7 wherein said firing means further comprise a plurality of said tube gas inlets, and a respective plurality of solenoid valves cooperating therewith.

10. A machine according to claim 7 wherein:

said second gas supplying means are joined in flow communication with said tube adjacent said barrel gas inlet to supply said second gas on said piston front face; and said tube includes a vent adjacent said tube gas inlet.

11. A machine according to claim 7 wherein said barrel further includes:

a seat adjacent said barrel gas inlet for supporting said seal; and a coaxial projectile inlet disposed atop said seat.

12. A machine according to claim 11 further comprising a plunger disposed in said projectile inlet for maintaining said seal in said seat, and having a side port aligned with said barrel gas inlet for channeling said second gas atop said seal for launching said projectile upon rupture of said seal.

13. A machine according to claim 7 wherein said first gas is air, and second gas is helium.

14. A method for cutting a workpiece by projectile impact comprising:

accelerating a piston in a compression tube by applying to a back face thereof a first gas under pressure;

compressing a second gas in said tube on an opposite front face of said piston as said piston accelerates therein, with said second gas having a greater speed of sound therein than said first gas; and firing said projectile through a barrel against said workpiece by applying said compressed second gas thereagainst.

15. A method according to claim 14 wherein said first gas is applied to said piston back face substantially instantaneously to increase pressure thereon to said first gas pressure in a time shorter than time of travel of said piston in said tube.

16. A method according to claim 15 further comprising sealing said barrel at said projectile temporarily during compression of said second gas for increasing pressure thereof to launch said projectile.

17. A method according to claim 16 wherein said piston is accelerated in a first direction, and said projectile is fired in a second direction, opposite to said first direction.

18. A method according to claim 17 further comprising retracting said piston after said projectile firing by injecting said second gas into said tube against said piston front face, and venting said first gas from said tube behind said piston back face.

19. A method according to claim 14 wherein said first gas is air, and second gas is helium.

20. A method according to claim 14 further comprising:

initially maintaining said first and second gases at ambient temperature; and accelerating said piston to adiabatically compress said second gas to launch said projectile as said piston travels freely through said compression tube and reaches the end of its travel therein.

* * * * *